(12) United States Patent
Wallace et al.

(10) Patent No.: US 8,517,383 B2
(45) Date of Patent: Aug. 27, 2013

(54) INTERACTIVE GAME BOARD SYSTEM INCORPORATING CAPACITIVE SENSING AND IDENTIFICATION OF GAME PIECES

(75) Inventors: Michael Wallace, Vancouver, WA (US); Philip Trevor Odom, Portland, OR (US)

(73) Assignee: Pure Imagination, LLC, Vancouver, WA (US)

( * ) Notice: Subject to any disclaimer, the term of this patent is extended or adjusted under 35 U.S.C. 154(b) by 1073 days.

(21) Appl. No.: 12/488,493

(22) Filed: Jun. 19, 2009

(65) Prior Publication Data
US 2009/0315258 A1    Dec. 24, 2009

Related U.S. Application Data

(60) Provisional application No. 61/132,620, filed on Jun. 20, 2008.

(51) Int. Cl.
*A63F 9/00*    (2006.01)

(52) U.S. Cl.
USPC .......... 273/237; 273/238; 463/1; 463/9; 235/435; 235/451

(58) Field of Classification Search
USPC ............ 273/236–237, 287, 460; 463/1, 463/9, 37; 235/435, 451
See application file for complete search history.

(56) References Cited

U.S. PATENT DOCUMENTS

| | | | |
|---|---|---|---|
| 5,013,047 A * | 5/1991 | Schwab | 273/238 |
| 6,568,683 B1 * | 5/2003 | Harpaz | 273/460 |
| 6,835,131 B1 * | 12/2004 | White et al. | 463/1 |
| 7,395,717 B2 * | 7/2008 | DeAngelis et al. | 73/728 |
| 7,578,195 B2 * | 8/2009 | DeAngelis et al. | 73/718 |
| 2004/0239650 A1 * | 12/2004 | Mackey | 345/174 |
| 2006/0175753 A1 * | 8/2006 | MacIver et al. | 273/237 |
| 2011/0248729 A2 * | 10/2011 | Mueller et al. | 324/686 |

* cited by examiner

*Primary Examiner* — Dmitry Suhol
*Assistant Examiner* — Alex P Rada
(74) *Attorney, Agent, or Firm* — Rylander & Associates, PC; Philip R. M. Hunt; Kurt M. Rylander

(57) ABSTRACT

An interactive game board system includes a game board, a plurality of capacitive sensors embedded in the game board, a microprocessor with input channels for the capacitive sensors, computer memory means, software instructions and data for directing an interactive game, one or more playing pieces with electrically an conductive portion, and power supply means. An interactive game board system includes interdigitated sensors. An interactive game board system includes capacitive sensors operating in dynamic sensing mode. An interactive game board system includes means for identifying individual game pieces. A method of providing an interactive game board system includes providing a game board, providing capacitive sensors, providing a microprocessor with input channels for the sensors, providing, computer memory means with software instructions for operating the interactive game system, providing a plurality of game pieces with an electrically conductive portion, detecting the presence or absence of game pieces in the vicinity of the sensors, determining the future direction of game play based upon the detecting step, and providing directive feedback to game players based upon the determining step. A method of providing an interactive game board system includes identifying individual game pieces.

12 Claims, 19 Drawing Sheets

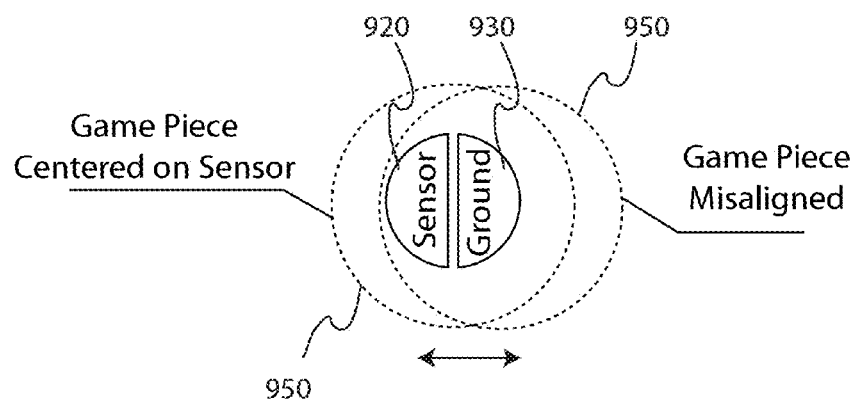
Fig. 8.d.

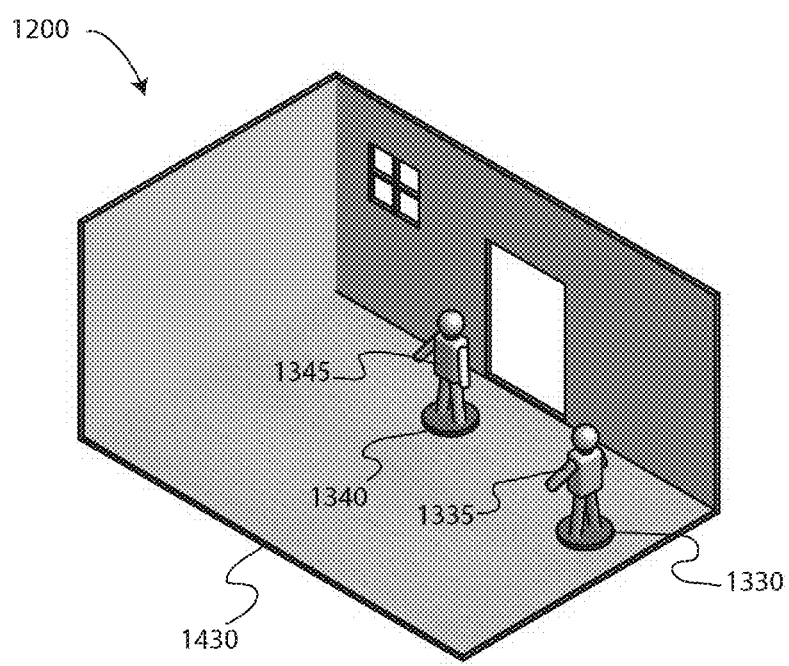
Fig. 11.a.

INTERACTIVE GAME BOARD SYSTEM INCORPORATING CAPACITIVE SENSING AND IDENTIFICATION OF GAME PIECES

CROSS-REFERENCE TO RELATED APPLICATION

This application claims priority to U.S. Provisional Patent Application Ser. No. 61/132,620, "Interactive Game System Incorporating Capacitive Sensing and Identification" filed Jun. 20, 2008.

FIELD OF THE INVENTION

The present invention relates to interactive board game systems. More particularly, the present invention relates to intelligent capacitive detection methods and apparatus for game boards and game pieces.

BACKGROUND

The recent proliferation of inexpensive computer processors has influenced games and toys. Game systems have been built which utilize computers and sensors to detect human interaction with elements of a board game. Some kinds of toys and games use embedded sensors in conjunction with control logic to increase the level of interaction by the players.

Many conventional stand-alone computer games provide a visual display of game activity through an electronic display system such as a pixilated flat panel display. Such displays lack a three-dimensional character, and obviate physical interaction between the player and tangible playing pieces, characteristics that are inherent in typical board-based games. One common feature of conventional board games is the use of one or more movable playing piece integral to the action of the game.

Physical interaction with a game board and game pieces is especially desirable for children's games. The interaction with the board and game pieces enhances the experience and more effectively brings the children into the game. Some games utilize player response or reaction time as a controlling element. An example of such a game is a quiz game where two or more players compete to answer a question, and the first player to respond after a question is asked gets the first opportunity to answer the question correctly and thereby gain points and advance in the score ranking. Yet another example is a game using a thrown die to control a decision point in the game flow, such as determining how many spaces a player will move his or her game piece.

Capacitive sensors are known. Generally such sensors use conductive plates placed in proximity to each other, such that proximity to some other object alters the capacitive coupling of the plates to one another and to ground. However, the geometry of the capacitive sensor, and the mode of use, are both critical in determining the utility of specific applications. The optimum geometry and mode of operation are not obvious from the theory of operation, and the development of reliable, low cost, multifunction capacitive sensor systems for game boards has required a great deal of experimentation and trial and error.

A typical capacitive touch sensor relies on the sheer size of the human body, and therefore the large capacitance between the human body and ground, which a board game piece lacks. There is significant capacitance between a person's body and the system ground simply because of the body's surface area. Game pieces have a much smaller surface area, and it was found in testing that a touch sensor using a single conductive pad is not effective at detecting a game piece.

In order to detect a game piece using capacitive sensing, placing the game piece on the game board over a sensor must cause a significant increase in capacitance between the sensor and ground. In order for this to occur, the sensors and game pieces must be designed to provide good capacitive coupling between the sensor pad and the game piece, and between the game piece and ground, when the game piece is placed on one of the sensor locations on a game board. Referring to FIG. 1, a simple circuit model for detection of a conductive object—either a game piece or the touch of a player—using a capacitive sensor is shown. The sensor has a capacitance to ground of $C_{SG}$. When a conductive object is placed in proximity to the sensor, and a person touches the object, the capacitance of sensor to ground $C_{SG}$ increases to match the capacitance of sensor to person $C_{OS}$ in series with object to ground $C_{OG}$. In a typical touch sensor application, no special provision is necessary for providing for capacitance between the user and ground—the large size of the person's body provides adequate capacitive coupling to ground. However, in order to reliably detect smaller items, such as board game pieces, the detection system must ensure effective object-to-sensor and object-to-ground capacitive coupling sensor, $C_{OS}$ and $C_{OG}$ respectively, in order to drive a large enough change in sensor-to-ground capacitance for detection and identification, where applicable. Referring to FIG. 2, a modified circuit is shown.

Thus, there is a need for an interactive game system using capacitive game piece and touch sensors that: (1) reliably detects game pieces when placed on a game board location; (2) reliably detects player touches on the game board; (3) reliably detects player touches on the game pieces; and, (4) reliably identifies individual game pieces.

Presently known art attempts to address this problem, but has not completely solved the problem. The following represents a list of known related art:

| Reference: | Issued to: | Date of Issue/Publication: |
| --- | --- | --- |
| U.S. Pat. No. 5,082,286 | Ryan et al | Jan. 21, 1992 |
| U.S. Pat. No. 5,129,654 | Bogner | Jul. 14, 1992 |
| U.S. Pat. No. 5,853,327 | Gilboa | Dec. 29, 1998 |
| U.S. Pat. No. 6,168,158 | Bulsink | Jan. 02, 2001 |
| U.S. Pat. No. 5,188,368 | Ryan | May 16, 1991 |
| U.S. Pat. No. 6,955,603 | Jeffway et al | Aug. 01, 2002 |

The teachings of each of the above-listed citations (which do not itself incorporate essential material by reference) are herein incorporated by reference. None of the above inventions and patents, taken either singularly or in combination, is seen to describe the instant invention.

U.S. Pat. No. 5,853,327 "Computerized game board" describes a system that automatically senses the position of toy figures relative to a game board and thereby supplies input to a computerized game system. The system requires that each game piece to be sensed incorporate a transponder, which receives an excitatory electromagnetic signal from a signal generator and produces a response signal which is detected by one or more sensors embedded in the game board. The complexity and cost of such a system makes it impractical for low-cost games and toys. Light emitter/sensor systems are also easily interfered with by players, dust and other objects, which can be especially frustrating with very young players who tend to be messy.

U.S. Pat. No. 5,082,286 "Sensory games", U.S. Pat. No. 5,129,654 "Electronic game apparatus", U.S. Pat. No. 5,188,368 "Electronic game apparatus", and U.S. Pat. No. 6,168,158 "Device for detecting playing pieces on a board" all describe systems using resonance frequency sensing to determine the position and/or identity of a game piece. Each of these systems requires a resonator circuit coupled with some particular feature of each unique game piece, which increases the complexity and cost of the system while reducing the flexibility of use.

Another approach to sensing player interaction is described in U.S. Pat. No. 6,955,603 "Interactive gaming device capable of perceiving user movement", which uses a series of light emitters and light detectors to measure the intensity of light reflected from a player's hand or other body part. Such a system requires expensive light emitters and light detectors, the number and spacing of which determines the spatial sensitivity for detection.

SUMMARY AND ADVANTAGES

A computer-controlled game system having a game board with a ground surface and one or more capacitive sensors embedded, each such sensor connected to an input pin of a microprocessor, whereby the microprocessor can under software or hardware control measure a change of capacitance between the sensor and the ground surface, associate the nature of the change of capacitance with the identity and/or proximity of an external object with the sensor, and thereby control the pattern and flow of game play in response to the identity and/or proximity of the external object.

In one embodiment of the invention, the external object to be sensed is a game piece constructed of or incorporating a conductive material in its base such that placing the game piece in proximity to a capacitive sensor modifies the measured capacitance between the sensor pad and the ground pad, thereby allowing the microprocessor to detect the presence of the game piece and accordingly modify the pattern and flow of game play.

In another embodiment of the invention, multiple capacitive sensors are arranged on the game board so that when a game piece is placed in proximity with one of the multiple sensors the microprocessor can measure a change in capacitance in a sensor, associate the change in measured capacitance with the location of the sensor, determine the position of the game piece, and accordingly modify the pattern and flow of game play.

In another embodiment of the invention, the external object to be sensed is a game piece constructed of or coated with a conductive substance such that when the game piece is placed in proximity to a capacitive sensor, touching the game piece with a hand or other body part of a player modifies the measured capacitance between the sensor and the ground surface, thereby allowing the microprocessor to determine when a game piece is touched by a player and accordingly modify the pattern and flow of game play.

In another embodiment of the invention, each of several game pieces to be sensed incorporates a different sized conductive base, such that each of the several game pieces, when placed in proximity to a capacitive sensor, produces a different modification of the measured capacitance between the sensor and the ground surface, thereby allowing the microprocessor to determine which of the several game pieces is in proximity to the sensor and accordingly modify the pattern and flow of game play.

In another embodiment of the invention, game piece identification is accomplished varying the distance of the game piece conductive base from the sensor pad by selectively varying the thickness of the non-conductive spacers attached to the bottoms of the conductive bases, thereby producing a corresponding predictable change in sensor-to-ground capacitance.

In another embodiment of the invention, a board game incorporating capacitive sensors with dynamic sensing modes is provided, including at least one dual-pad capacitive sensor includes a pad electrically connected to a configurable I/O of a microprocessor, such that the configurable I/O is configured by the game software to ground when the sensor is intended to be used as a game piece or touch detector, and the configurable I/O is configured by the game software to input when the sensor is intended to be used as a proximity sensor.

In another embodiment of the invention, the external object to be sensed is a finger or other body part of a player, and the capacitive sensor comprises a two-pad capacitive sensor using solid pads, where one of the leads is electrically connected to the ground surface and the capacitance between the grounded lead and the ungrounded lead is measured, such that the capacitance change depends on the surface area of the finger or other body part in intimate proximity to the sensor and therefore on the pressure with which the finger or other body part is pressed against the surface of the game board in the area of the sensor, thereby allowing the microprocessor to detect the pressure with which a finger or other body part is pressed against the game board and accordingly modify the pattern and flow of game play. In another embodiment of a game system utilizing the invention, the game could be a musical game that incorporated a two-pad sensor configured with one lead connected to ground. The microprocessor could continuously monitor the capacitance of the sensor, which would vary depending on whether and how hard a player pressed the surface of the game board. The microprocessor could produce an auditory output, the volume, tone and/or timbre of which could vary as the capacitance varied.

In another embodiment of the invention, the external object to be sensed is a multi-sided die whereby each face of the die contains a unique amount of conductive material such that when any one face of the die is in intimate contact with a capacitive sensor, the measured capacitance between the sensor and the ground surface allows the microprocessor to determine which face of the die is in contact with the capacitive sensor and accordingly modify the pattern and flow of game play.

In another embodiment of a game system utilizing the invention, the game used to determine when a player has moved his or her game piece. Upon sensing a change in capacitance of one of the sensors, the microprocessor could produce audio and/or visual output instructing the player to perform some action.

In another embodiment of a game system utilizing the invention, the game could be a variation on the children's game "Simon Says", and involve a multiplicity of game pieces, each of which is placed on one of a multiplicity of spots on the game board. A sensor placed under each spot is used to determine both when a game piece was sitting on the spot, and when a player touches the piece sitting on a spot. The microprocessor produces audio or visual instructions to a player that requires manipulation of a particular piece on a particular spot, then provides audio or visual feedback if the player touches the wrong piece, or moves the correct piece to the wrong spot.

In another embodiment of a game system utilizing the invention, the game is a progressive game and utilizes a series of game pieces, each of which contains a different sized conductor in the base so as to produce a unique change in capacitance that allows the microprocessor to differentiate among the game pieces. By sensing which piece is located on a given sensor, the microprocessor could determine the progress made by each player, and thereby determine not just that a player has reached a particular spot in the progression, but which player it is and produce appropriate auditory or visual feedback as a result.

In another embodiment of a game system utilizing the invention, the game board incorporates multiple dual-pad sensors functioning in a dynamic sensing mode, where each pad is electrically connected to an I/O channel of a microprocessor. In a first mode, the game software causes the microprocessor to configure the I/O channels for both pads as inputs, such that the capacitive sensors act as proximity sensors. In a second mode, the game software causes the microprocessor to configure the I/O channel of one pad of one or more sensors for input and the I/O channel of the other pad of those sensors as ground, such that the capacitive sensors consist of a sensor pad and ground pad for game piece or simple touch sensing.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 8a shows an embodiment of the invention.

FIG. 8b shows an embodiment of the invention

FIG. 8c shows an embodiment of the invention

FIG. 8d shows an embodiment of the invention

FIG. 11a shows an embodiment of the invention incorporating a grounded plane in a three-dimensional application.

DETAILED DESCRIPTION

Figure 1:
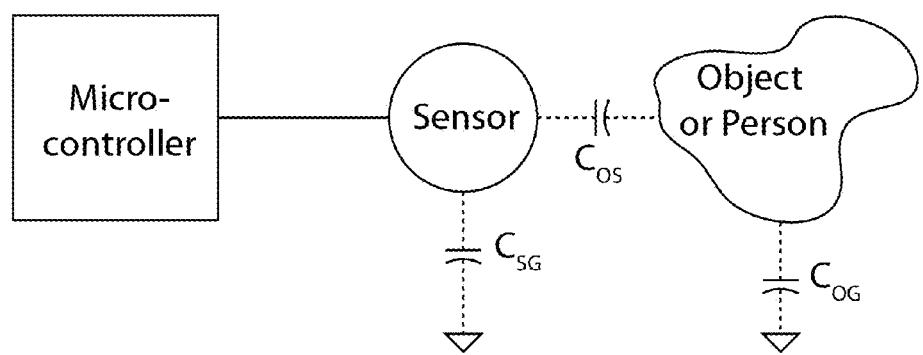
FIG. 1 shows the operation of a conventional single-pad capacitive sensor.

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Throughout this Specification reference will be made to certain terms that the inventors have assigned meanings to that may not be conventional.

A "pad" refers to a sensing conductor arranged in a planar pattern as part of a capacitive sensor, and a pad may be of any shape, such as a solid pad covering an area, a linear conductor, a complex shape with multiple branches, or some other open or closed polygonal shape such as a circle, half-circle, square, etc.

A "solid pad" refers to a pad with conductive material which covers a continuous area. A "solid pad" may be a conductive material applied to a surface (such as metal foil or conductive ink) or a plate of conductive material (such as a metal disk).

A "single-pad sensor" refers to a capacitive sensor that includes a single conductor in electrical communication with a microprocessor input/output channel.

A "two-pad sensor" refers to a capacitive sensor that includes two separate conductors—a sensor pad in electrical communication with a microprocessor input/output channel, and a ground pad in electrical communication with system ground.

A "sensor pad" refers to a pad of a capacitive sensor in electrical communication with an input/output channel of a microprocessor.

A "ground pad" refers to a pad of a capacitive sensor in electrical communication with the system ground.

A "ground plane" is a conductive surface built into a game board with a large area relative to the sensor pads, such that the ground plane area overlaps a plurality of sensor pads.

In this Specification "I/O" refers to an input/output channel of a microprocessor.

Game piece detection may be achieved using a two-pad design and single-ended signal conditioning, such that one pad of a capacitive sensor is connected to a microprocessor input channel (the sensor pad) and the other pad of the capacitive sensor to the microprocessor ground (the ground pad). This design is optimal for detecting a floating (ungrounded) conductive object, such as a game piece with a conductive metal base plate. The basic goal in the sensor design for game piece detection is that the conductive base of the game piece equally overlaps the sensor pad and ground pad. If the game piece could reliably be limited to a particular spot (an unlikely scenario, especially for children's games) the sensor design could use two rectangular plates such that each plate would overlap one-half of the game piece base plate. However, this would not be ideal for a game board design in which the exact location of the game piece placement over each sensor area cannot be controlled.

Single channel conditioning for game piece detection does not have the detection range and sensitivity to act reliably as a proximity sensor, for example to detect the presence of a player's hand hovering over a touch pad button. A single channel touch sensor can be converted into a proximity sensor with longer detection range by leaving the sensor pad connected to the microprocessor I/O channel, and connecting the second pad (the ground pad) to a parallel I/O channel on the microprocessor. Such a hybrid sensor design allows the capacitive sensor to be used as a game piece/touch sensor or a proximity sensor at different times during the game.

Switching the parallel I/O channel of the microprocessor between ground and I/O can be done through software instructions controlling the operation of the microprocessor. Thus, a dynamic sensor mode is provided. Dynamic sensor modes can include basic touch sensing, pressure sensing, or proximity sensing at any given time during the game play. A dynamic sensor mode also provides the ability to use the same capacitive sensor to identify individual game pieces using methods and apparatus described elsewhere in this Specification.

Basic touch sensing can be used in a manner similar to a mechanical button. The game software would process the sensor input as a simple on or off state. The trigger could be when the touch sensor is touched, when it is released, or based on sustained touch. Basic touch sensing mode includes multiple tapping ability as well—e.g. rapidly tapping the sensor to simulate a race between the game players/characters.

Pressure sensing mode responds based on the contact area of the touch, e.g. a player's finger tip. The contact area of the player's finger tip overlapping the capacitive sensor area will increase if the player pushes down harder with his finger tip as the finger tip "squishes" outward. The increased overlap area from pressing the player's finger tip harder creates a proportionally increased capacitive coupling, and a correspondingly increased capacitive output signal, which can be used for qualitative controls, such as increasing the volume or changing the pitch of an audio output.

Proximity detection responds to the proximity of a game piece or player's hand to the sensor. With both conductors of the capacitive sensor connected to parallel I/O channels on the microprocessor the sensor is more sensitive and has greater detection range, allowing for a different game mode. For example, at a certain point in the game the players may be directed to hold their hands over a "buzzer" on the game board, and the first one to hit the "buzzer" gets the advantage (to give an answer to a question perhaps). The "buzzer" is a touch sensor that has been reconfigured electronically as a proximity sensor so that the game software will not proceed with the game until it detects the players' hands hovering over all the "buzzers". When the game proceeds, the sensor reverts to basic touch sensor to detect the first player's touch.

Interdigitated Capacitive Sensor

Capacitive sensors, whether single pad or dual pad sensors, require capacitive coupling from sensor pad to ground and from object to ground, as well as object to sensor pad. The object must therefore overlap both the sensor pad and the ground pad, or in the case of a single pad sensor the object must overlap the sensor pad and the ground. A problem arises in assuring proper placement of the object—in this case a game piece or a finger—in order to assure adequate overlap.

Figure 17:
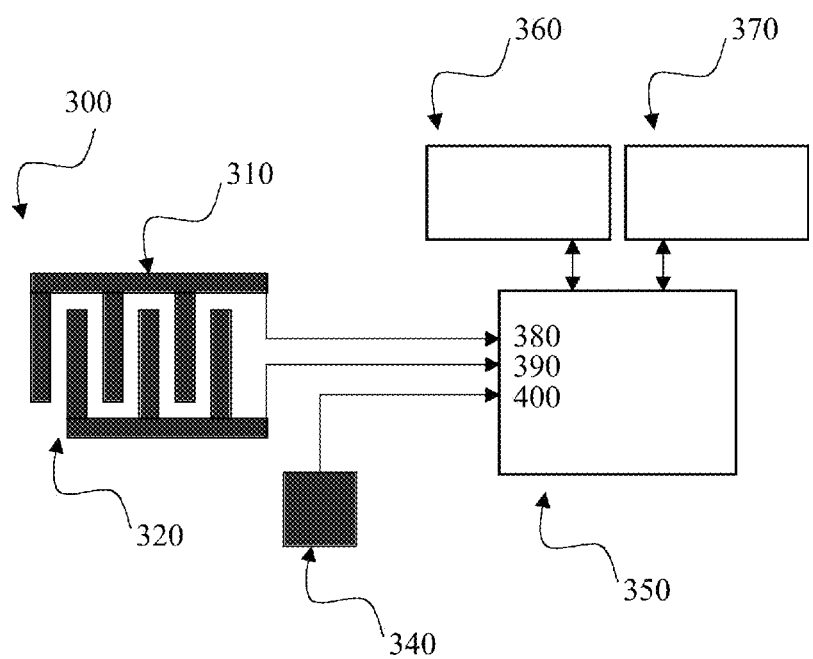
FIG. 17 shows a block diagram of an embodiment of the invention using an interdigitated capacitive sensor.

Use of interdigitated capacitive sensors addresses the placement problem. "Interdigitated" means the sensor pad—in this case a conductor shaped like a comb—is interleaved with the ground pad—also shaped like a comb. The interleaving design assures that placement of an object over any portion of the sensor will result in approximately equal area overlap of object-to-sensor pad and object-to-ground pad and therefore provide a more uniform response. Interleaving ground and sensor pads also reduces unwanted sensitivity to more distant objects due to the close proximity of the ground pad to the sensor pad at any given point on the sensor pad. The homogenous shape of the sensor provides uniform response to touch or a game piece anywhere within the sensor area. FIG. 17 shows an exemplary schematic for an interdigitated capacitive sensor.

Figure 5:
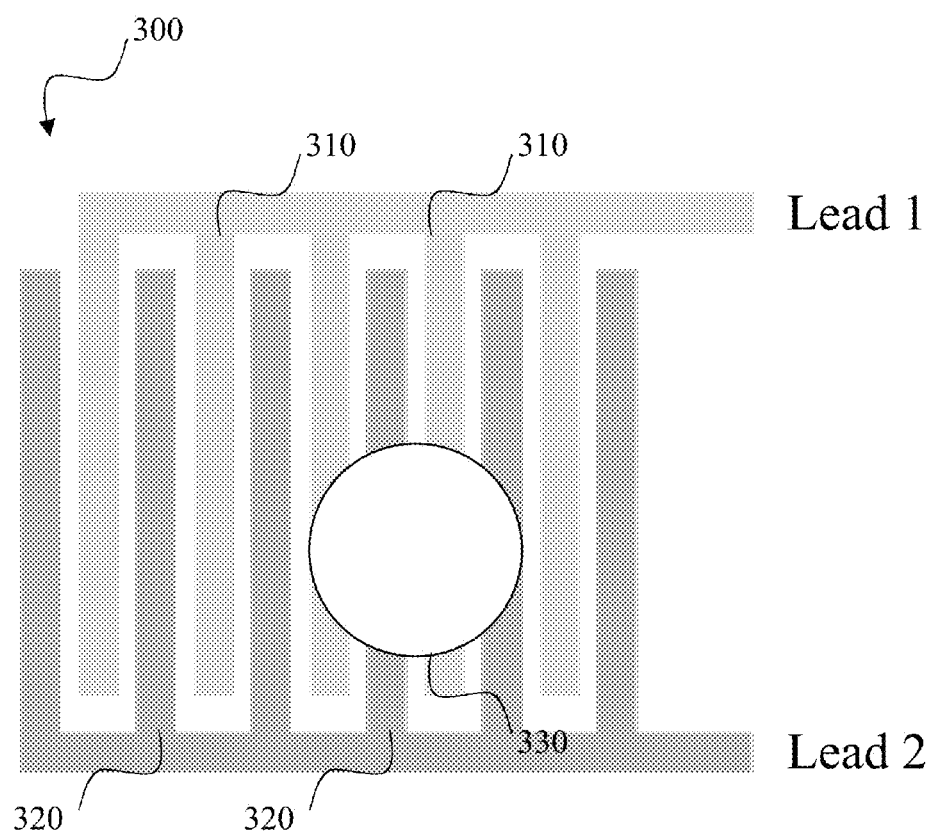
FIG. 5 shows an embodiment of an interdigitated capacitive sensor.

Interdigitated sensors with one conductor grounded provide more uniform response over the sensor area, but the design provides reduced sensitivity as well. Capacitance is roughly proportional to the area of the sensor conductor, and the interdigitated sensor design will have less total sensor conductor area than a plate for the same dimensions, as can be seen in FIG. 5. The interdigitated sensor conductor area is reduced for a given sensor pad area to accommodate the spacing between sensor conductor "teeth" and the ground conductor "teeth". The interdigitated sensor also results in a larger base sensor-to-ground capacitance $C_{SG}$ compared to a two-plate system, due to the greater overlapping area of the sensor conductor and the ground conductor. Baseline capacitance is actually quite large compared to the change in capacitance caused by the presence of an object or touching the sensor. The expected change in sensor-to-ground capacitance caused by a person touching a sensor would be approximately 10%, while the presence of a conductive game piece would cause a similar or slightly smaller change. This is not a problem for typical touch sensor applications with long sampling times. However, in detecting game pieces, or in rapid-touching applications, the larger total capacitance ($C_{SG}$ and $C_{OS}$) will increase the sampling time required for the sensor to achieve a given resolution due to the increased time constant of the larger capacitance. The increased time constant must be accounted for in determining what type of trigger is used in the microcontroller input channel.

The interdigitated sensor design can also be used in a dynamic mode, where the ground pad is electronically switched between ground and a parallel I/O channel on the microprocessor.

Two-Pad Capacitive Sensor System

Another solution addressing the game piece placement problem utilizes a two-pad capacitive sensor, with side-by-side pad arrangement, wherein the game piece conductive base is oversized compared to the area of the sensor pad and ground pad to accommodate misalignment. The ground pad can be switched electronically between ground and a parallel I/O channel to provide dynamic mode capability.

Several alternative two-pad side-by-side sensor designs can be useful. In the first design, the capacitive sensor includes two semi-circular pads side-by-side. The second includes of side-by-side rectangular pads. The third uses concentric pads, where the center pad typically connected to a sensor channel and the outer ring grounded. The concentric design is especially suited to touch sensing applications, since the sensor pad is in the middle of the game piece area.

To allow for misalignment of the game piece with the sensor the game piece conductive base should be larger than the area of the combined sensor pad and ground pad. As long as the game piece conductive base completely overlaps both pads, sensor response is very consistent regardless of game piece placement.

Sensor Pad and Ground Plane System

Figure 9:
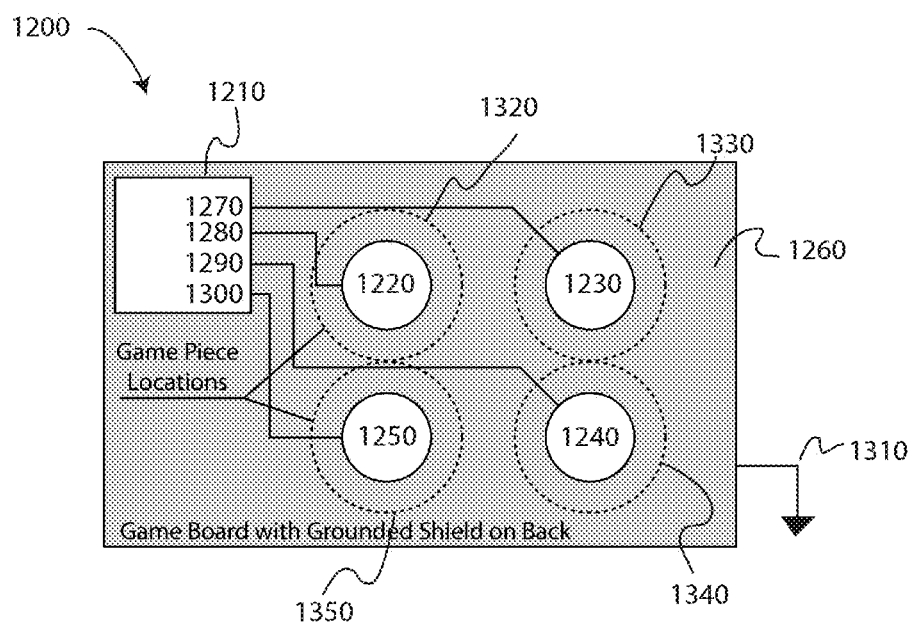
FIG. 9 shows an embodiment of the invention incorporating a grounded plane.

An alternative system for game piece detection includes a game board with sensor pads on the game board surface, and a ground plane within the game board in close proximity to the surface mounted sensor pads. Capacitive coupling between the game pieces and the ground plane can provide adequate game-piece-to-ground capacitance without the use of a dedicated ground pads on the top surface of the game board. FIG. 9 illustrates a game board constructed in this fashion In order to achieve sufficient capacitive coupling between the game pieces and the shield, the conductive bases of the game pieces must be made larger than the sensor pads so that the game pieces' conductive bases will extend past the boundaries of the sensor pad and overlap the ground plane. If the sensors are the same size as or larger than the game piece bases, the sensors will block the game piece from adequately coupling to the ground plane.

Capacitive coupling between a game piece base and a ground shield on the back of the game board will be less than between the game piece and a ground pad on the top side of the game board. For a given sensor size and game piece size, this will result in a smaller increase in sensor-to-ground capacitance when a game piece is placed on a sensor. It may be necessary to compensate for this by making the area of the game piece conductive bases larger, the area of the sensors larger, or both. Using a thinner material for the game board will also increase coupling between the game pieces and the ground shield by moving the shield closer to the game pieces. Decreasing the thickness of the board, however, increases base level sensor-to-ground capacitance, so the board thickness is a compromise between these two factors. The disadvantage of reduced sensitivity is partly offset by the shielding effect of the ground plane, which reduces effects of nearby non-game conductive objects.

Game Piece Identification

Three related methods for game piece identification using dynamic mode capacitive sensors in game boards.

Area Variation

The first method provides game pieces with bases including an area of conductive material on the bottom surface. Varying the area of the conductive material to correspondingly vary the area of overlap by the game piece conductive material and the sensor pad and ground pad provides a means to identify the particular game piece. This method works well with interdigitated sensors because of the homogeneous density of the sensor pad and ground pad conductors, so the coupling area—and therefore the sensor response—is roughly proportional to the area of the game piece base. However, using variable area conductors in game pieces may not provide reliable variations in capacitance when used with one-pad or two-pad plate sensors. Additionally, variable area conductors may be more expensive to manufacture in some cases, for instance where a game piece has a complex base shape.

Distance Variation

Alternatively, game piece identification can be accomplished by selectively varying the thickness of spacers attached to the game piece conductive bases. Capacitive coupling is inversely proportional to separation distance between the object and the sensor pad, and the object and the ground pad. The separation between the metallic base and the capacitive sensor can be varied among the game pieces in order to produce predictable variations sensor response to identify individual game pieces. Variable thickness can be achieved easily using a plastic layer on the bottom of each game piece, where each game piece uses a different thickness of plastic in order to set the separation distance between the sensor and the metallic base. The game piece with the thinnest plastic layer will produce the highest capacitive coupling when placed on a sensor pad. Conversely, game pieces with thicker plastic layers provide a lower capacitive coupling. The spacers should be made from materials that are good insulators with high dielectric constant relative to the game piece conductive base.

Multiple game pieces can be identified in this way. The inventors were able to track up to four game pieces during testing. An exemplary embodiment uses three game pieces having 5 mil, 20 mil, and 50 mil plastic, respectively, laminated over the game pieces' metallic bases Dielectric Variation A third technique provided to identify game pieces varies the dielectric constant of the spacer material separating the sensor pad and ground pad from the conductive game piece base. Capacitive coupling is proportional to the dielectric constant of the spacer material for a constant spacer thickness. The higher the dielectric constant of the spacer material, the larger the change in capacitance when the game piece is placed on the sensor.

Figure 3:
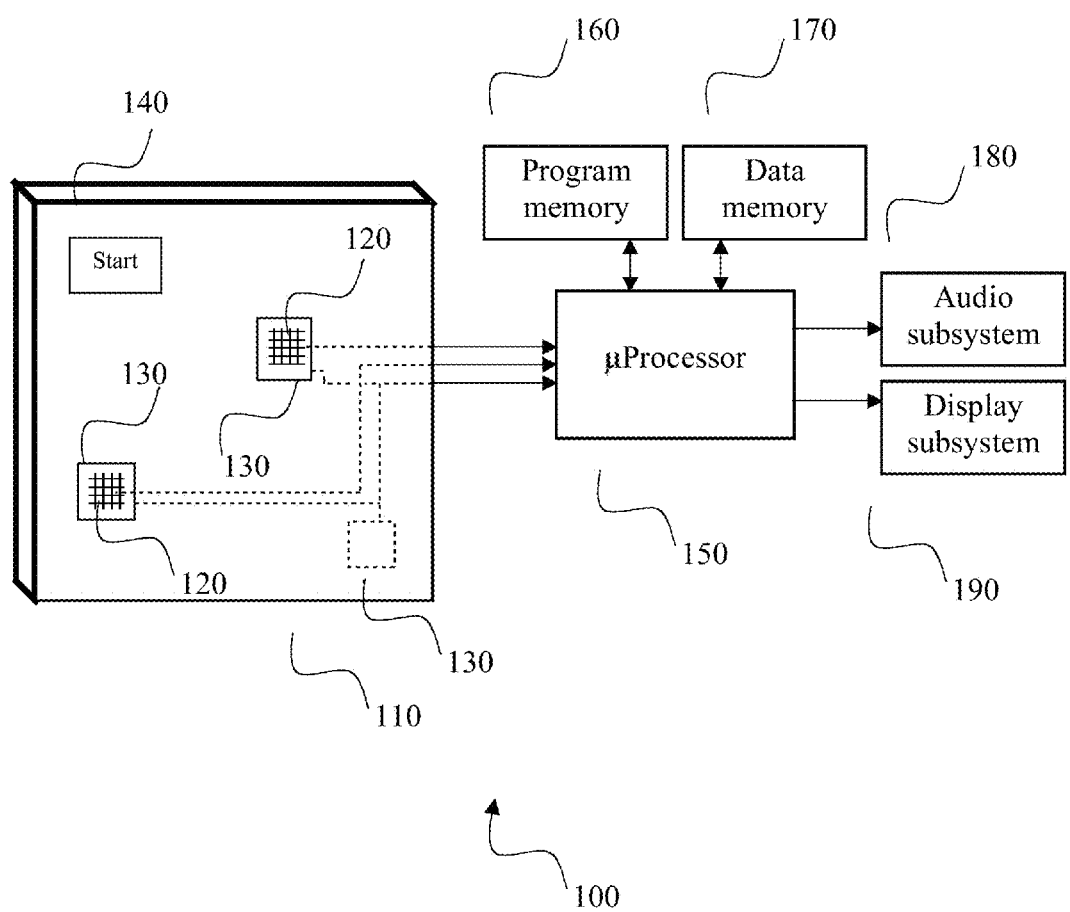
FIG. 3 shows a first embodiment of the invention.

FIG. 3 shows the component parts of a computer-controlled game system 100 utilizing the features of this invention. A game board 110 incorporates one or more capacitive sensors 120 the configuration, number and position of which determine the sensing capabilities of the game system. The game board 110 may be rigid, semi-rigid or flexible, and the capacitive sensors are preferably constructed from conductive film or paint in an appropriate pattern overlaid on a Mylar or other flexible plastic sheet. The plastic sheet is one of the layers that constitute the game board along with a top surface 140. The game board 110 also incorporates one or more ground surface 130 constructed from conductive film or paint that may be on the same layer as the capacitive sensors or may be on a separate layer. The top surface 140 of the game board preferably incorporates an image, pattern or design relevant to the goals and objectives of the game.

The capacitive sensors 120 and ground surface 130 are electrically connected to a microprocessor 150. The interconnection may be direct to the pins of the microprocessor or may be through a multiplexer, interface or other intermediate circuit capable of selectively connecting one or more sensor to one or more pins of the microprocessor. Preferably, each capacitive sensor 120 is directly connected to a general-purpose input-output (GPIO) pin of the microprocessor, and via a pull-up resistor to the positive power supply voltage. Preferably each ground surface 130 is connected to the neutral or common power supply ground point.

GPIO pins preferably have Schmitt triggered inputs to accommodate the relatively slow buildup of capacitance across the resistor to the threshold indication level. GPIO may draw too much current such that the input gets stuck at some intermediate voltage and does not build up to the threshold indication level—and therefore the system won't register the game piece/touch. Schmitt triggers are able to accommodate this slower rate of change, but GPIO's lacking Schmitt triggers may still be adequate in many cases. Charging time and actual capacitance level reached are affected by (1) distance, (2) coupling area and (3) dielectric constant of intervening material (i.e. air, plastic, cardboard, felt pad on bottom of piece, etc).

The microprocessor 150 utilizes internal and/or external program memory 160 and data memory 170, either or both of which may be removable. Microprocessor 150 further connects to an audio subsystem 180 and a display subsystem 190 both of which are used to provide instruction and/or feedback to a user of the game system.

A person familiar with the art will recognize that the elements of the computer-controlled game system may be grouped or combined in various means, and that some components of the game system, notably the audio subsystem 180 or the display subsystem 190, may be eliminated.

During the use of the computer-controlled game system 100, an object such as a playing piece, a finger, a hand, or other body part may be brought or placed in proximity with a capacitive sensor 120. Microprocessor 150 executes computer instructions read from program memory 160, one portion of the computer instructions comprising a routine to read the capacitance values from capacitive sensors 120. When microprocessor 150 detects a change of capacitance value from a capacitive sensor 120, such as produced by the placing of a playing piece, a finger, a hand, or other body part on or in proximity to the capacitive sensor 120, the microprocessor changes the state of the system, and may also produce or change the production of sound from an audio subsystem 180, and may also change or produce a display effect from a display subsystem 190.

Figure 2:
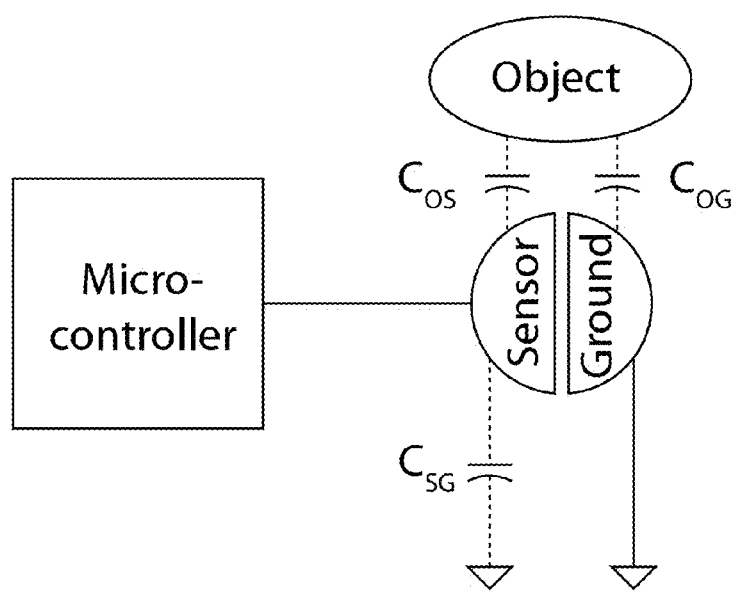
FIG. 2 shows the operation of a dual-pad capacitive sensor.
Figure 4:
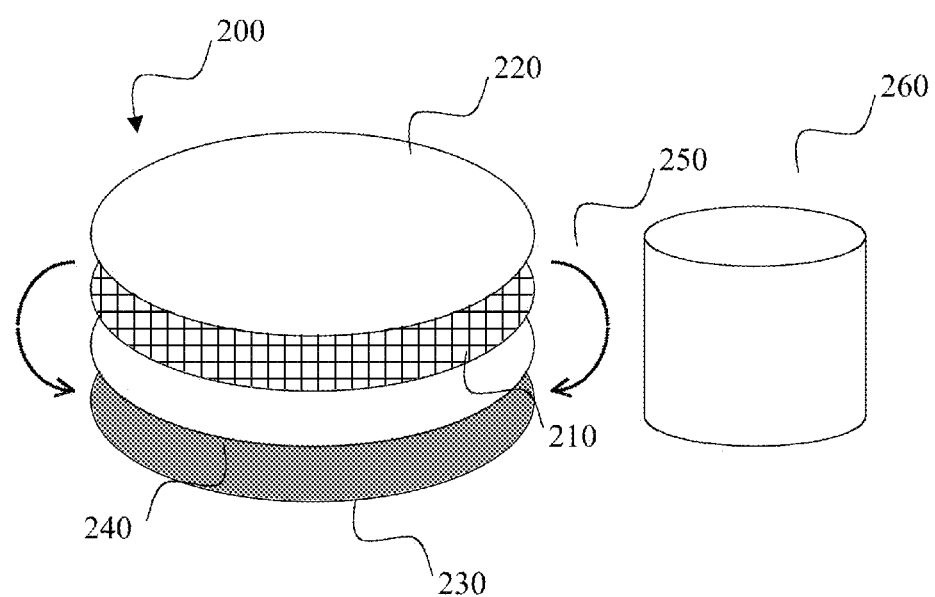
FIG. 4 shows the construction of a conventional capacitive sensor.

Preferably the capacitive sensor utilizes a relaxation oscillator for signal conditioning, with a gradual buildup of charge and rapid discharge, but other signal conditioning methods could be used FIG. 4 depicts a conventional capacitive sensor 200 for comparison. A conventional capacitive sensor 200 is constructed from a conductive area 210 covered by a non-conductive substance 220. The conductive area 210 is charged to a voltage different from that of a ground reference surface 230. In FIG. 2, the ground reference surface 230 underlies the conductive area 210 with a non-conductive substance 240 separating them. The non-conductive substance that separates the conductive area 210 from the ground reference surface 230 may be the same as the non-conductive substance 220 that covers the conductive area 210, or may be different.

Figure 15:
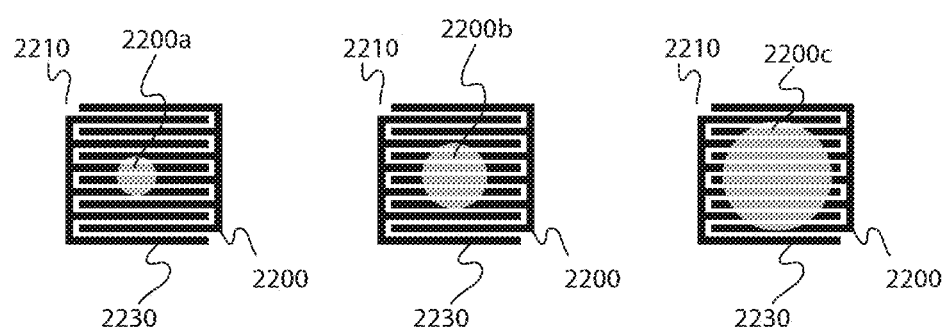
FIG. 15 shows an embodiment of the invention relating to game piece identification.
Figure 16:
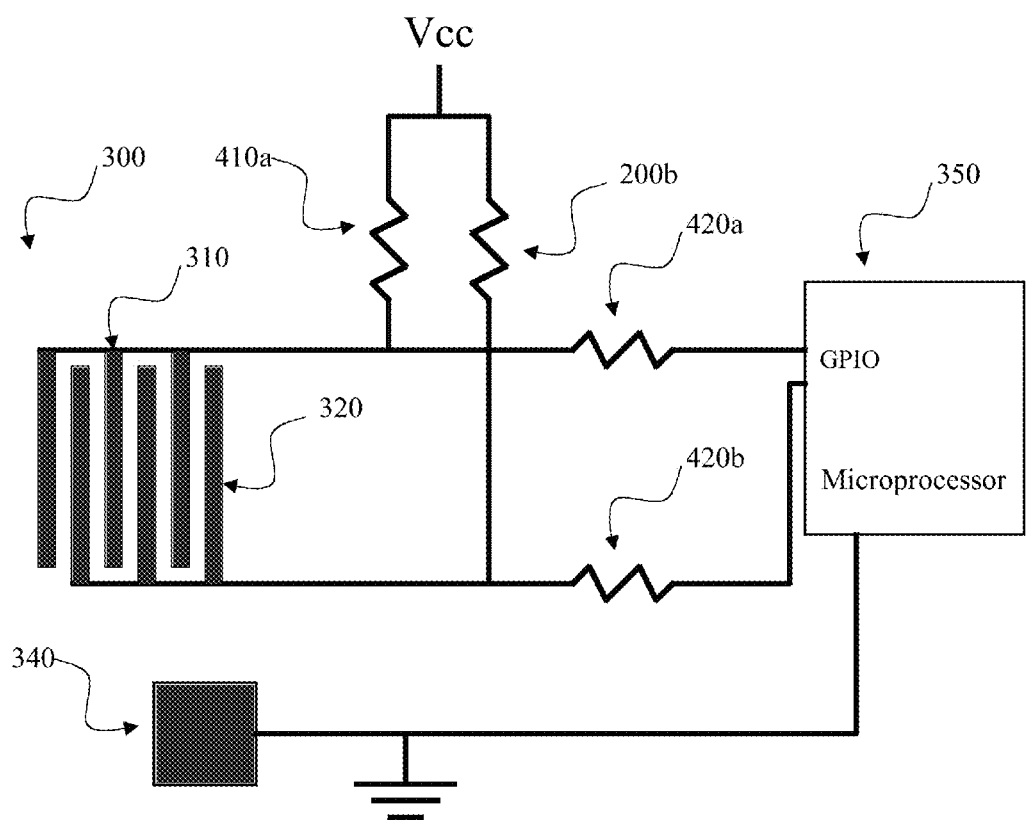
FIG. 16 shows an embodiment of the invention showing a schematic of an interdigitated capacitive sensor.

Referring to FIGS. 5, 15 and 16, an embodiment of game board incorporating an interdigitated capacitive sensor is provided. FIG. 5 shows a surface view of an interdigitated sensor 300, which comprises a first series of sensor fingers 310 electrically connected together ('Lead 1') and interspersed between a second series of sensor fingers 320 also electrically connected ('Lead 2') together but not connected to the sensor fingers 310. In one preferred embodiment Lead 1 is connected to a GPIO pin on the microprocessor, while Lead 2 is connected to a common reference point. In this configuration, a conductive object 330 placed within the area of an interdigitated sensor 300 may overlap the large area of the sensor fingers both charged sensor fingers 310 and ground fingers 320. Notably, if the size of the conductive object 330 is larger than the widths of the interdigitated fingers 310 and 320 of a sensor 300, but smaller than the overall size of the sensor, the measured change in capacitance due to the effect of the conductive object will be relatively insensitive to the precise position of the conductive object within the sensor area. In practice an interdigitated sensor assembly would include non-conductive layers both above and below the fingers to avoid the possibility of direct electrical contact between the two conductive regions. The interdigitated sensor design is relatively insensitive to game piece placement within the sensor area, due to the large area overlap of the interlaced fingers, which provide a relatively constant overlap density and therefore a relatively constant sensitivity over the entire area of the sensor—even near the edges of the sensor. Although the interdigitated sensor is less sensitive than side-by-side pad designs, the interdigitation reduces sensitivity to near objects and flattens the detection profile over the face of the sensor—the goal is predictability, not necessarily sensitivity.

Referring to FIGS. 16 and 17, schematic and block diagrams for an interdigitated sensor are shown. Capacitive sensor 300 is electrically connected to a microprocessor 350. Capacitive sensor 300 is connected to the positive supply voltage Vcc through a pull-up resistor 410, and through a series resistor 420 to a GPIO pin of microprocessor 350. In the case of an interdigitated sensor, each of the two leads, or pads, 310 and 320, is connected through a pull-up resistor 410 to Vcc and through a series resistor 420 to separate GPIO pins 380 and 390. A ground surface 340 is connected to a common reference ground 400. The series resister 420 is preferred in order to protect the microprocessor from ESD, but is not required for the sensor to function. Other protective methods are known, such as ensuring adequate insulation from ground. Microprocessor 350 can monitor one or more sensors 300 as inputs to the software instructions stored in computer memory to direct the pattern and flow of a game.

Software instructions to control the operation of the game system and data are stored in memory means 360 and 370. Program memory 360, including software instructions, and data memory 370, including data arrays, are shown as separate blocks in the schematic, but may be physically coextensive on microprocessor 350 or as separate computer memory means. GPIO 390 can be internally switched between an input channel 390 and ground 400 to provide dynamic sensing mode capabilities. Switching is accomplished electronically through software instructions based on the flow of the game play.

Figure 6:
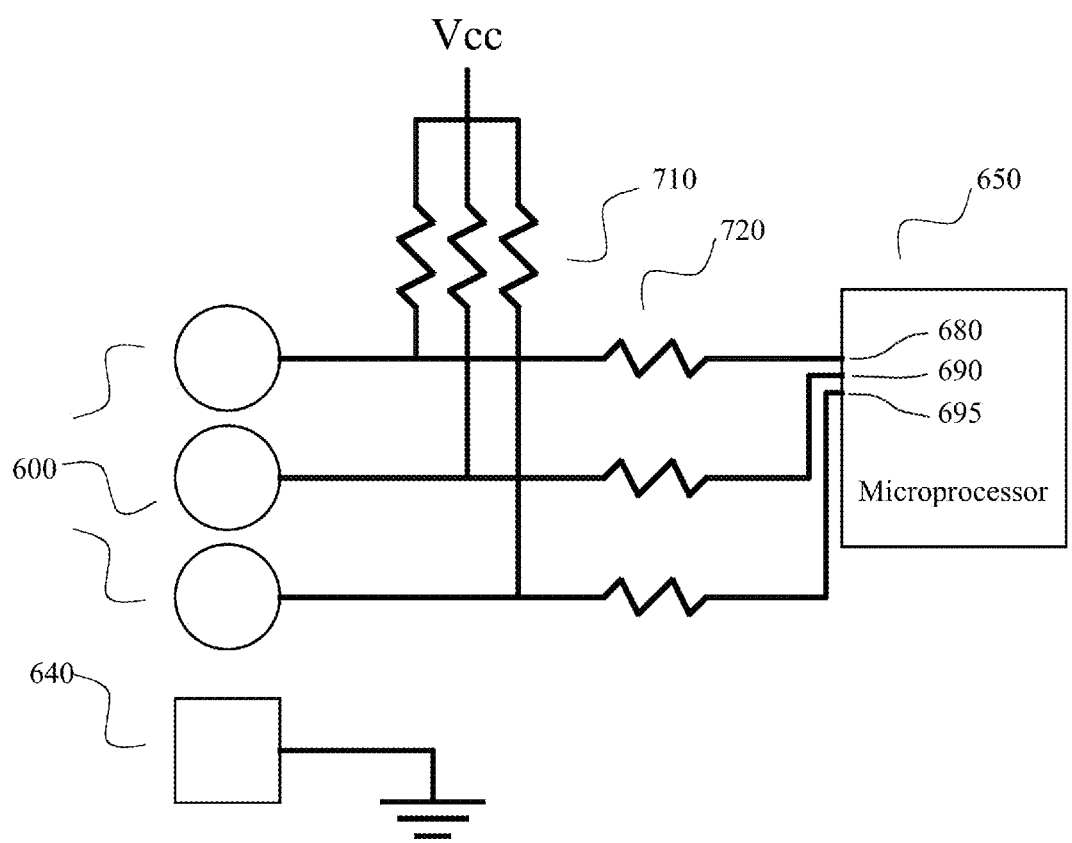
FIG. 6 shows an embodiment of the invention.

FIG. 6 shows a method of interconnecting capacitive sensors 600 to a microprocessor 650. Each capacitive sensor 600 is connected to the positive supply voltage Vcc through a pull-up resistor 710, and through a series resistor 720 to a GPIO pin of microprocessor 650. In the case of an interdigitated sensor, each of the two leads, or pads, is connected through a pull-up resistor to Vcc and through a series resistor to separate GPIO pins 680, 690 and 695. A ground surface 640 is connected to a common reference point. The series resister 720 is preferred in order to protect the microprocessor from electrostatic discharge (ESD), but is not required for the sensor to function. Other protective methods are known, such as ensuring adequate insulation from ground.

Microprocessor 650 can monitor one or more sensors 600 as inputs to the software instructions stored in computer memory to direct the pattern and flow of a game.

Figure 7:
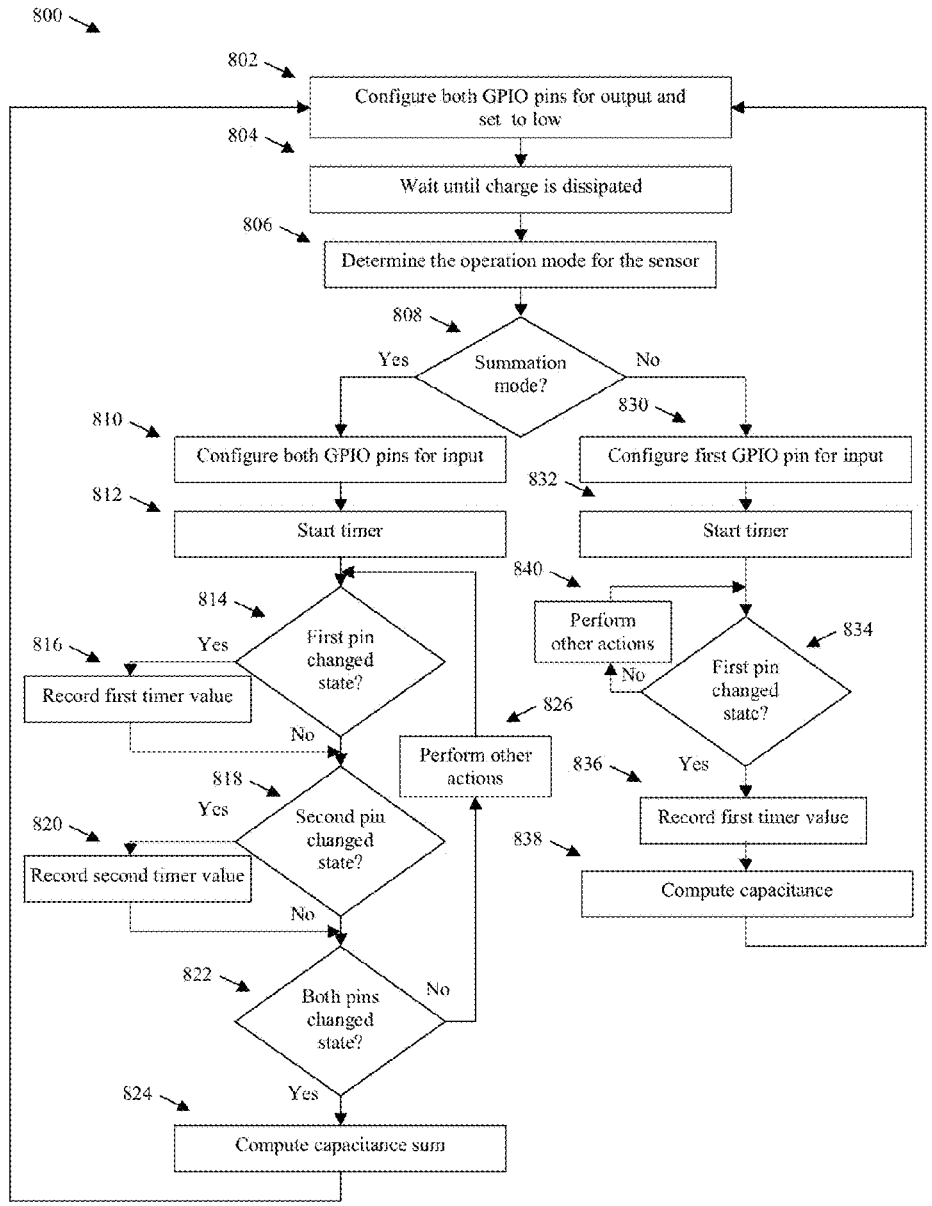
FIG. 7 shows a flow chart of the method of the invention.

FIG. 7 shows a flowchart 800 of the operation of the capacitance-sensing system. At a step 802, the two GPIO pins in electrical connection with the leads of the capacitance sensor are configured for output and set to low. At a step 804, the microprocessor waits until the charge on the capacitance sensor leads is dissipated. At a step 806, the microprocessor determines which capacitance-sensing mode is to be employed. At a step 808, the microprocessor branches based on the capacitance-sensing mode.

In a first summation mode, at a step 810 both GPIO pins are configured for input and allowed to float. At a set 812, a timer is started. The timer may be a hardware timer integral to the microprocessor, or may be a software time comprising the repetitive loop of program instructions in steps 814-824 described below, the number of repetitions of which is used as a measure of elapsed time. At a step 814, the microprocessor tests if the first GPIO pin has changed input state. If so, at a step 816 the microprocessor records the timing indication for the first sensor lead. At a step 818, the microprocessor tests if the second GPIO pin has changed input state. If so, at a step 820 the microprocessor records the timing indication for the second sensor lead. At a step 822, the microprocessor determines if both pins have changed state. If so, the microprocessor computes the capacitance sum from the stored first and second timer values, then returns to the initiation step 802. If not, the microprocessor performs other actions as required at a step 826 before returning to the test at step 814.

In a second differential mode, at a step 830 one GPIO pin is configured for input and allowed to float, while the other GPIO pin is held at ground. At a step 832 a timer is started. At a step 834, the microprocessor determines if the GPIO pin has changed state. If so, at a step 836 the microprocessor records the timing indication for the sensor lead. At a further step 838 the microprocessor computes the capacitance value from the stored first value, and then returns to the initiation step 802. If not, the microprocessor performs other actions as required at a step 840 before returning to the test at step 834.

The operations of flowchart 800 could be performed in other sequences while still accomplishing the same result. Similarly, it should be recognized that the capacitance-sensing system could be embodied in discrete circuitry, in a field-programmable gate array, or in a special-purpose integrated circuit to accomplish the same steps.

Figure 8:
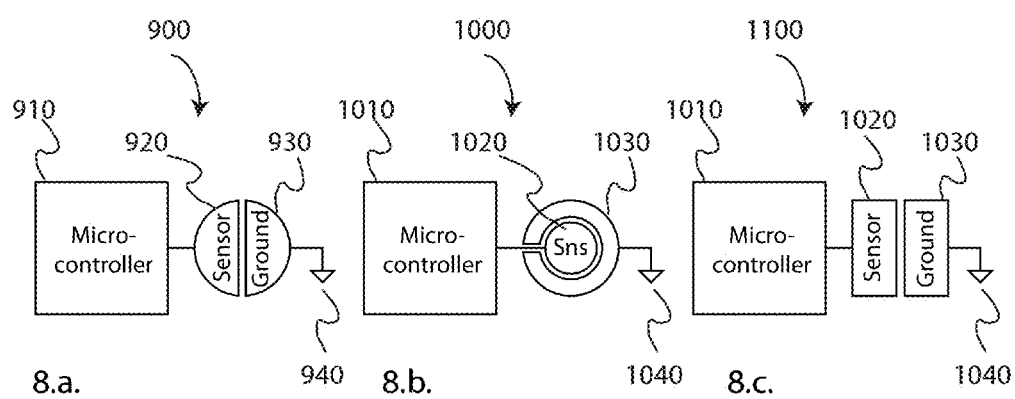
FIG. 8 shows several arrangements of dual-pad embodiments of the invention.

Referring to FIGS. 8*a*-*d*, further embodiments of two-pad capacitive sensor configurations are shown. Referring to FIG. 8*a*, capacitive sensor 900 includes a sensor pad 920 in electrical communication with a GPIO channel on microprocessor 910. Ground pad 930 is in electrical communication with system ground 940. Sensor pad 920 and ground pad 930 are solid pads in semi-circle shape. Referring to FIG. 8*b*, capacitive sensor 1000 includes a sensor pad 1020 in electrical communication with a GPIO channel on microprocessor 1010. Ground pad 1030 is in electrical communication with system ground 1040. Ground pad 1030 is arranged concentrically around sensor pad 1020. Referring to FIG. 8*c*, capacitive sensor 1100 includes a sensor pad 1120 in electrical communication with a GPIO channel on microprocessor 1110. Ground pad 1130 is in electrical communication with system ground 1140. Sensor pad 1120 and ground pad 1130 are rectangle shaped solid pads. Referring to FIG. 8*d*, the conductive base of game piece 950 is made larger than the combined areas of sensor pad 920 and ground pad 930, for example, to ensure equal overlap even if game piece 950 is not centered on capacitive sensor 900. Grounds 940, 1040, and 1140 may be independently connected, or may be provided through a GPIO channel on microprocessor 910, 1010, and 1110, respectively, which can be electronically switched between ground and input to provide dynamic mode sensing capability.

Referring to FIGS. 9, 10, 11, and 11*a*, another embodiment of an interactive game board 1200 is shown, incorporating a grounded plane 1260. Game board 1200 includes a ground plane 1260 which overlaps the entire playing area of game board 1200. A plurality of sensor pads 1220, 1230, 1240, and 1250, provide game piece detection of game pieces 1320, 1330, 1340, and 1350, respectively. Each of sensor pads 1220, 1230, 1240, and 1250 is electrically connected to a GPIO channel 1270, 1280, 1290, and 1300, respectively, on microcontroller 1210. Each of GPIO channels 1270, 1280, 1290, and 1300 are configured as input channels, and not grounded. Ground plane 1260 is electrically connected to system ground 1310, to provide sensor-to-ground coupling and object-to-ground coupling for capacitive sensing. Game pieces 1220, 1230, 1240, and 1250 are made with conductive bases larger than the area of the sensor pads in order to ensure adequate overlap with ground plane 1260 for object-to-ground coupling.

Figure 10:
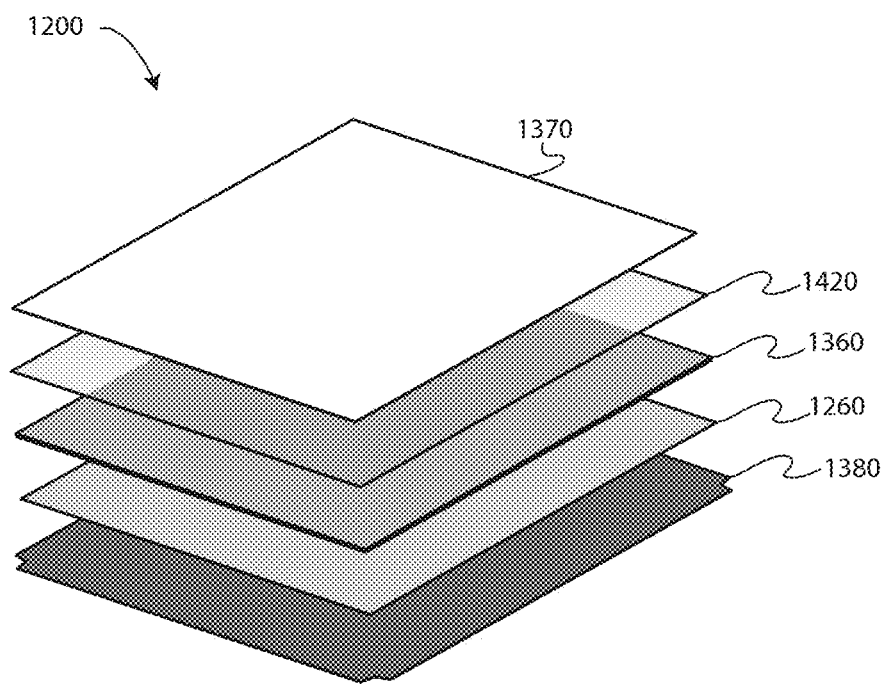
FIG. 10 shows an embodiment of the invention incorporating a grounded plane.

Referring to FIG. 10 a method of constructing an interactive game board 1200 with a ground plane 1260 is shown. Capacitive sensors 1220, 1230, 1240 and 1250 are printed onto a sensor layer 1420 of polyester film of two mils thickness. A top layer 1370 laminated over sensor layer 1420. Intermediate layer 1360 is sandwiched between sensor layer 1420 and grounded back plane 1260 to provide adequate separation. Preferably intermediate layer 1360 is at least 3 mils thick and made from relatively non-conductive material, such as chipboard. Grounded back plane 1260 is preferably made from a thin foil of conductive material, such as aluminum foil or an applied film of conductive material. Game board back wrap 1380 is laminated to the back side of ground plane 1260 for protection and decoration.

Figure 11:
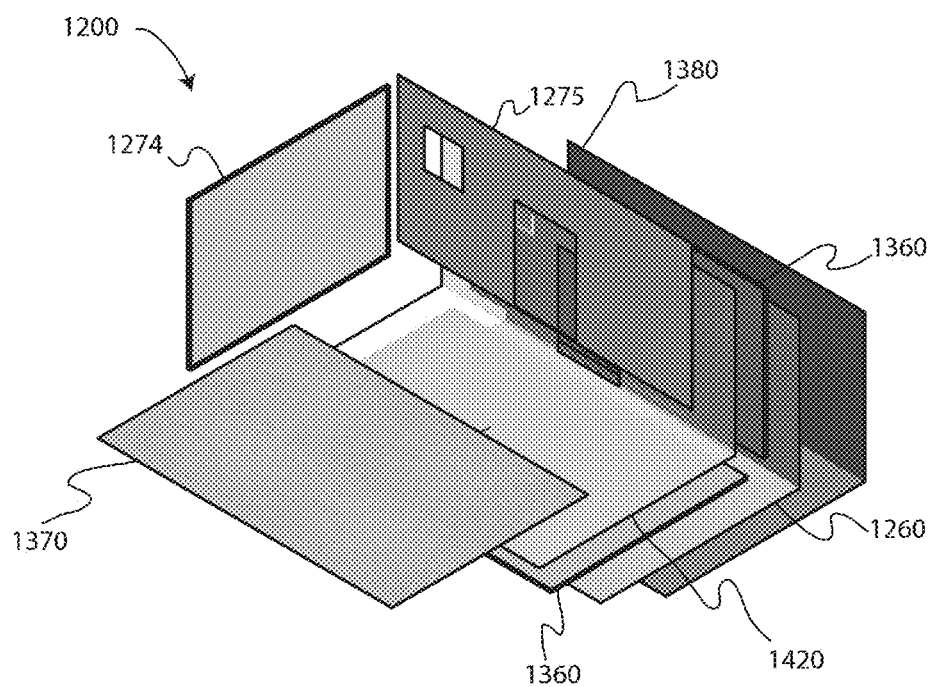
FIG. 11 shows an embodiment of the invention incorporating a grounded plane in a three-dimensional application.

Referring to FIGS. 11 & 11*a* it is seen that all of the principles discussed relating to game boards incorporating capacitive sensor systems is equally applicable to three dimensional play sets. Play set 1200 includes printed floor paper 1370, wall paper 1372, and side board 1374, to provide the game environment. Capacitive sensors are printed onto a sensor layer 1420 of polyester film of two mils thickness. Intermediate layer 1360 is sandwiched between sensor layer 1420 and grounded back plane 1260 to provide adequate separation. Printed outside wall decoration 1380 provides protection and decoration. The layers are laminated together to produce the walls and floor of a play set structure 1430. The game piece upper portions 1335 and 1345 may also be made from conductive material in order to couple to capacitive sensors embedded in vertical walls of play set 1430. In addition to character game pieces, sensor-identifiable objects such as furnishings, cars, and pets can be included in the embodiment.

Figure 12:
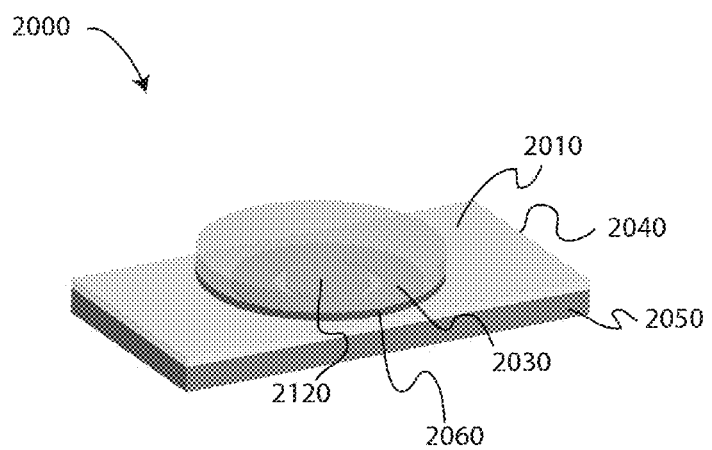
FIG. 12 shows an embodiment of the invention relating to game piece identification.

Referring to FIGS. 12, 13, 14, and 15, embodiments and methods for game piece identification are shown. Referring to FIG. 12, a game piece with a conductive base 2000 is shown. Preferably game piece conductive base is made from a conductive metal foil or stamped disk, such as aluminum. Spacer 2060 is laminated to the bottom of conductive base 2000. Dual-pad capacitive sensor 2010 includes a sensor pad 2020 electrically connected to a GPIO input channel of a microprocessor (not shown) and ground pad 2030 electrically connected to a system ground (not shown). Sensor 2010 is printed onto sensor overlay 2040. Preferably sensor 2010 is an applied conductive material such as conductive ink or paint, but may be any conductive material appropriate for the application, such as conductive foil or other easily manipulated and applied materials. Sensor overlay 2040 is laminated onto game board 2050, which provides structural strength and protection. Spacer 2060 is made to a selected thickness, such that the distance created between conductive base 2000 and sensor 2010 creates a predictable change in the measured capacitance from conductive base 2000 being laid directly over sensor 2010. Spacer 2060 is preferably a non-conductive and easily worked material such as plastic. Each game piece is provided with a spacer 2060 of different thickness so as to be identifiable to the game system based on varied capacitance. Preferably spacer 2060 is provided in thickness increments of 15 mils. Spacer thicknesses of 5 mil, 20 mil and 50 mil, using plastic spacers, produced reliable identification of game pieces.

Figure 13:
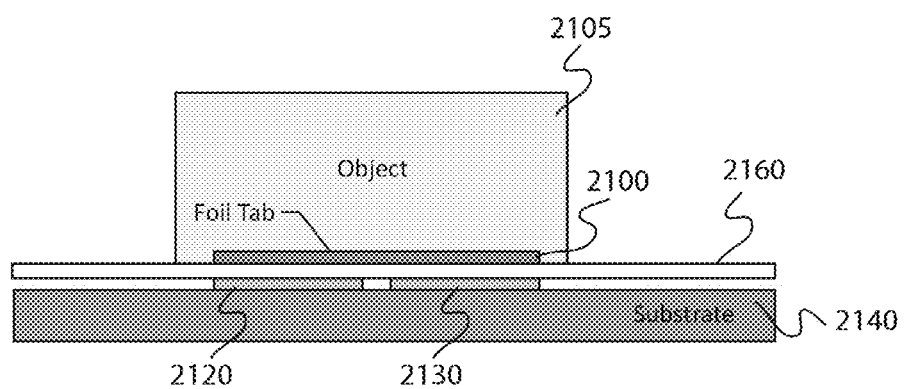
FIG. 13 shows an embodiment of the invention relating to game piece identification.
Figure 14:
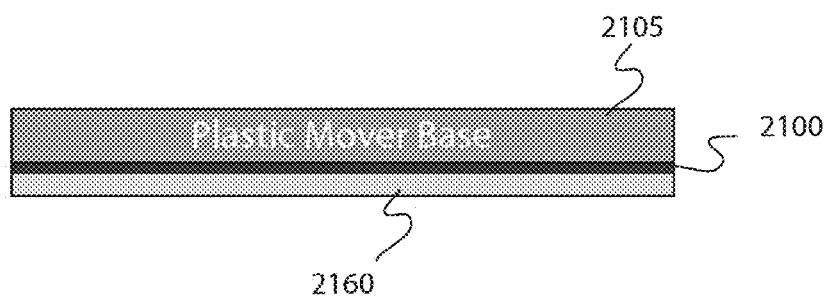
FIG. 14 shows an embodiment of the invention relating to game piece identification.

Referring to FIGS. 13 and 14, a game piece 2105 with a conductive base 2100 is shown positioned over dual-pad capacitive sensor 2110. Sensor 2110 includes a sensor pad 2120 and ground pad 2130 printed onto substrate 2140. Spacer 2160 is laminated to the bottom of conductive base 2100. Spacer 2160 includes of a thin piece of non-conductive material of standard thickness with a selected dielectric constant. By maintaining constant thickness among spacers 2160, but varying the dielectric constant of each spacer, the capacitive coupling of each game piece 2105 can be varied by predicable magnitudes, and the game system can identify individual game pieces. Dielectric constant of spacer 2160 can be varied by selecting alternate materials for each spacer 2160, or by doping the spacer material during fabrication. Maintaining constant thickness for spacer 2160 can be advantageous for automated manufacturing processes.

Referring to FIG. 15, first, second and third game pieces with conductive bases 2200a, b & c, respectively, are shown positioned over interdigitated capacitive sensor 2210. Interdigitated sensor 2210 includes a sensor pad 2220 and ground pad 2230. The capacitive coupling of the respective conductive bases 2200 is proportional to the area of overlap by conductive base 2200a, b, c of sensor pad 2220 and ground pad 2230. The greater the area of overlap, the greater the capacitance. The different magnitudes of capacitance are used to identify the individual game pieces. The interdigitated sensor 2210 is relatively unaffected by minor variations in placement of the game pieces due to the homogenous overlap sensor pad 2220 and ground pad 2230 throughout the interleaving pattern.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

We claim:

1. An interactive game board system, comprising:
a game board including a playing area surface;
a capacitive sensor with a pair of adjacent conducting pads embedded in said game board;
a processor with a pair of input/output channels, each electrically coupled to one of the pair of conducting pads, the processor with a system ground; and
wherein the processor is configured to measure capacitance of the capacitive sensor in one of a summation mode and a non-summation mode, wherein the processor configured to measure capacitance in the summation mode is configured with both of the pair of input/output channels configured for input float and wherein the processor configured to measure capacitance in the non-summation mode is configured with at least one of the pair of input/output channels set to system ground.

2. The interactive game board system of claim 1 further comprising:
a ground plane embedded in the game board and electrically coupled to the system ground.

3. The interactive game board system of claim 1, the capacitive sensor further comprising an interdigitated capacitive sensor.

4. The interactive game board system of claim 1, wherein the conducting pads have symmetrical semi-circular shapes in a side-by-side arrangement.

5. The interactive game board system of claim 1, wherein include the conducting pads have symmetrical rectangular shapes in a side-by-side arrangement.

6. The interactive game board system of claim 1, wherein the conducting pads include a round pad and a circular pad surrounding the round pad and concentric therewith.

7. The interactive game board system of claim 1,
further comprising a plurality of playing pieces, each of the plurality of playing pieces including an electrically conductive portion; and
wherein the processor is configured to identify one of a plurality of playing pieces based on measured capacitance when the one of the plurality of playing pieces is set on the capacitive sensor.

8. The interactive game board system of claim 7,
wherein each of the plurality of playing pieces has one of a plurality of spacers coupled to a bottom of the electrically conductive portion of the playing piece; and
wherein each of the plurality of spacers is of a different thickness.

9. The interactive game board system of claim 7, wherein the electrically conductive portion of each of the plurality of playing pieces has a different area.

10. The interactive game board system of claim 7,
wherein each of the plurality of playing pieces has one of a plurality of spacers coupled to a bottom of the electrically conductive portion the playing piece; and
wherein each of the plurality of spacers has a substantially similar thickness and a different dielectric constant.

11. The interactive game board system of claim 1, wherein the processor is configured to measure capacitance of the capacitive sensor in the summation mode by performing the steps of:
configuring the pair of input/output channels for output and setting to system ground;
waiting until charge has dissipated from the input/output channels;
configuring the pair of input/output channels for input;
timing charging times of each of the pair of input/output channels;
computing the capacitance of each of the pair of conducing pads based on the charging time of the respective one of the pair of input/output channels; and
computing the capacitance of the capacitive sensor by summing the capacitance of each of the pair of conducting pads.

12. The interactive game board system of claim 11, wherein the processor is configured to measure capacitance of the capacitive sensor in the non-summation mode by performing the steps of:
configuring the pair of input/output channels for output and setting to system ground;
waiting until charge has dissipated from the input/output channels;
configuring one of the pair of input/output channels for input;

timing a charging time for the one of the pair of input/
output channels configured for input; and
computing the capacitance of the capacitive sensor based
on the charging time for the one of the pair of input/
output channels configured for input.

* * * * *